(12) United States Patent
Belanger et al.

(10) Patent No.: US 8,627,834 B2
(45) Date of Patent: Jan. 14, 2014

(54) CONTROL SYSTEM FOR VEHICLE WASHING SYSTEM

(75) Inventors: Michael J. Belanger, Novi, MI (US);
Barry S. Turner, Novi, MI (US);
Thomas E. Weyandt, Novi, MI (US);
Curtis S. Prater, Warren, MI (US)

(73) Assignee: Belanger, Inc., Northville, MI (US)

( * ) Notice: Subject to any disclaimer, the term of this patent is extended or adjusted under 35 U.S.C. 154(b) by 1043 days.

(21) Appl. No.: 12/384,066

(22) Filed: Mar. 31, 2009

(65) Prior Publication Data

US 2009/0250086 A1 Oct. 8, 2009

Related U.S. Application Data

(60) Provisional application No. 61/123,030, filed on Apr. 4, 2008.

(51) Int. Cl.
*B08B 3/00* (2006.01)
(52) U.S. Cl.
USPC .......................................................... 134/123

(58) Field of Classification Search
USPC .......................................................... 134/123
See application file for complete search history.

(56) References Cited

U.S. PATENT DOCUMENTS

| | | | | | |
|---|---|---|---|---|---|
| 3,708,816 | A | * | 1/1973 | Napoli | 15/53.2 |
| 5,993,739 | A | * | 11/1999 | Lyon | 422/31 |
| 2002/0112745 | A1 | * | 8/2002 | Belanger et al. | 134/34 |

\* cited by examiner

*Primary Examiner* — Jason Ko
(74) *Attorney, Agent, or Firm* — Warn Partners, P.C.

(57) ABSTRACT

A vehicle washing system. The vehicle washing system includes a vehicle washing system component. Also, provided is an apparatus for moving the vehicle relative to vehicle washing system component. The speed of the relative motor of the vehicle is selected either by an operator automatically or may be varied to vary the vehicle throughput through the vehicle wash. A control unit is provided. The control unit senses the speed of movement of the vehicle with respect to the vehicle washing system. The control unit adjusts the vehicle washing system component for coordinating the vehicle washing system component in accordance with the speed of the vehicle.

66 Claims, 6 Drawing Sheets

CONTROL SYSTEM FOR VEHICLE WASHING SYSTEM

CROSS-REFERENCE TO RELATED APPLICATIONS

This application claims the benefit of U.S. Provisional Application No. 61/123,030, filed Apr. 4, 2008. The disclosure of the above application is incorporated herein by reference.

FIELD OF THE INVENTION

The present invention relates to a control system for a vehicle washing system. More particularly, the present invention relates to a control system for a conveyor type vehicle washing or car washing line.

BACKGROUND OF THE INVENTION

In the past, components used in vehicle washing lines have been hydraulically driven. These various components include the conveyor system that moves a vehicle through the wash line. The hydraulic systems of the past have also been configured to operate at a set rate or rates of speed without any type of control mechanism for maximizing the overall efficiency of the system. Thus, there is a need to maximize the efficiency of the system by controlling the rate of speed at which the system operates.

Additionally, the efficiency of the system may be improved from the standpoint of controlling the number of resources used. Typically, the components in the vehicle washing line include nozzles for applying liquids, and chemical mixing devices for applying various chemicals in predetermined ratios to the vehicle. Additionally, other components of the car wash include wheel systems for agitating and washing the sides and tops of vehicles, and also include some type of drying system used for drying vehicles at the end of the conveyor line. In order for the components of the car wash system to operate properly, all the wash components are calibrated to run based on the conveyor line moving the vehicle at a single speed. The speed of the conveyor was controlled separately from the other vehicle wash components. The speed of vehicle throughput could only be changed by changing conveyor speed without changing the speed of the other wash components or without changing the speed of the other components automatically. Certain wash components only operate at a single speed, or are adjustable but do not have the ability to compensate for the change in speed of the conveyor. In the past, the only options that were available to the car wash operator were options for turning on and off certain features individually, such as various cleaning features which may be used in various levels of the wash such as may be selected by the vehicle wash consumer.

Therefore, there has been a need in the art of vehicle wash systems to allow more flexibility in controlling vehicle throughput and other features of a vehicle wash line. In addition to controlling the rate of vehicle throughput of the system, it is also desirable to control the operating characteristics of the individual components which are part of the vehicle washing system. By controlling the operating characteristics such as equipment speed, water flow, number of drying units used, and the mixing of wash chemicals, the overall system can be improved to reduce operating costs and maximize the use of resources.

SUMMARY OF THE INVENTION

In accordance with the present invention, a vehicle washing system having one or more controlled components. The present invention also includes an apparatus for moving the vehicle relative to the controlled components at a rate of speed. A control unit is provided and is operable to adjust one of the one or more controlled components and the rate of speed relative to a desired vehicle throughput of the vehicle washing system.

Additionally, the vehicle washing system includes a vehicle washing system component. Also provided is an apparatus for moving the vehicle relative to vehicle washing system component. The relative speed of the motor vehicle is selected either by an operator or automatically in order to vary the vehicle throughput through the vehicle wash. The control unit senses the speed of movement of the vehicle with respect to the vehicle washing system. The control unit adjusts the vehicle washing system component for coordinating the operation of the vehicle washing system component in accordance with the speed of the vehicle.

Additionally, a control system for a conveyor type vehicle washing system is provided which includes a vehicle wash line including at least one vehicle wash line component, and a vehicle conveyor for engaging and moving a vehicle along the vehicle wash at a pre-selected speed. A group of sensors are also provided which includes at least one sensor for sensing and reporting the number of vehicles waiting in line, and controlling the speed of the conveyor of the vehicle wash line. A control unit is provided for sensing the number of vehicles in line, and selecting the speed of the conveyor in accordance with pre-selected values.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
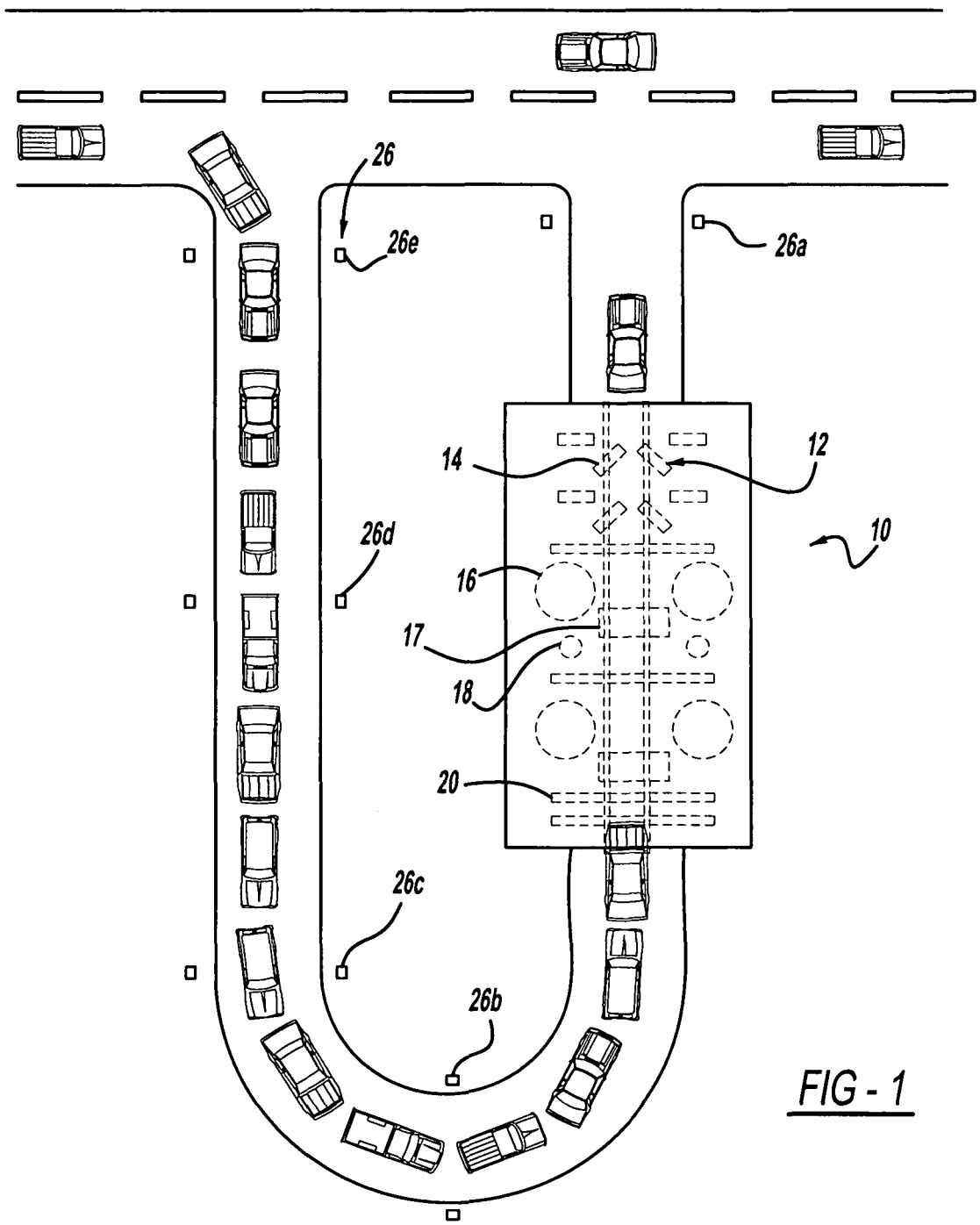
FIG. 1 is a plan view of a vehicle wash site plan, according to the present invention.

The following description of the preferred embodiment(s) is merely exemplary in nature and is in no way intended to limit the invention, its application, or uses.

Referring now to the Figures, in accordance with the present invention there is provided a vehicle washing system, generally shown at 10. In a broad aspect, the present invention includes a vehicle wash system component, generally indicated 12, another wash system component which is an apparatus 22 for moving a vehicle relative to the wash system component of 12, and a control unit 24 which controls the washing system component based on a demand 25. The demand 25 can include one or more factors which include user input signals, sensor signals based on system the number of vehicles at the ingress of the wash system, a clock signal indicating the time of day, a photo sensor indicating the amount of light outside the vehicle washing system, weather signal indicating the presence of precipitation, a vehicle speed sensor signal, the speed of the apparatus 22 which can be a conveyor or sensor signals indicating a back-up of vehicles at the point of egress. However, the demand 25 is not limited to these factors, rather demand 25 includes all factors that will ultimately effect the throughput of the vehicle wash system. In response to the demand 25, the control unit 24 sends commands to two or more of the components 12 of the system 10. The commands adjust the speed or variance of the components 12 or apparatus 22. The variance can be set between zero and one-hundred percent, depending upon the input received by the control unit 24.

Typical vehicle washing system components 12 used in the present vehicle washing system 10 include dryers 14, wheels 16, chemical applicators 18, mitters 17, and liquid delivery systems 20. Vehicle washing system 10 of the present invention includes an apparatus, such as a conveyor 22, for moving a vehicle relative to the vehicle washing system component 12 at a selectable and variable speed. The control unit 24 is provided which is typically a computer or computer-controlled unit. One advantage of the present invention is that the control unit 24 has the ability to sense the vehicle demand 25 and adjust the operation of any of the components 12 and conveyor 22 concurrently or individually based on the demand 25.

Figures 4, 5:
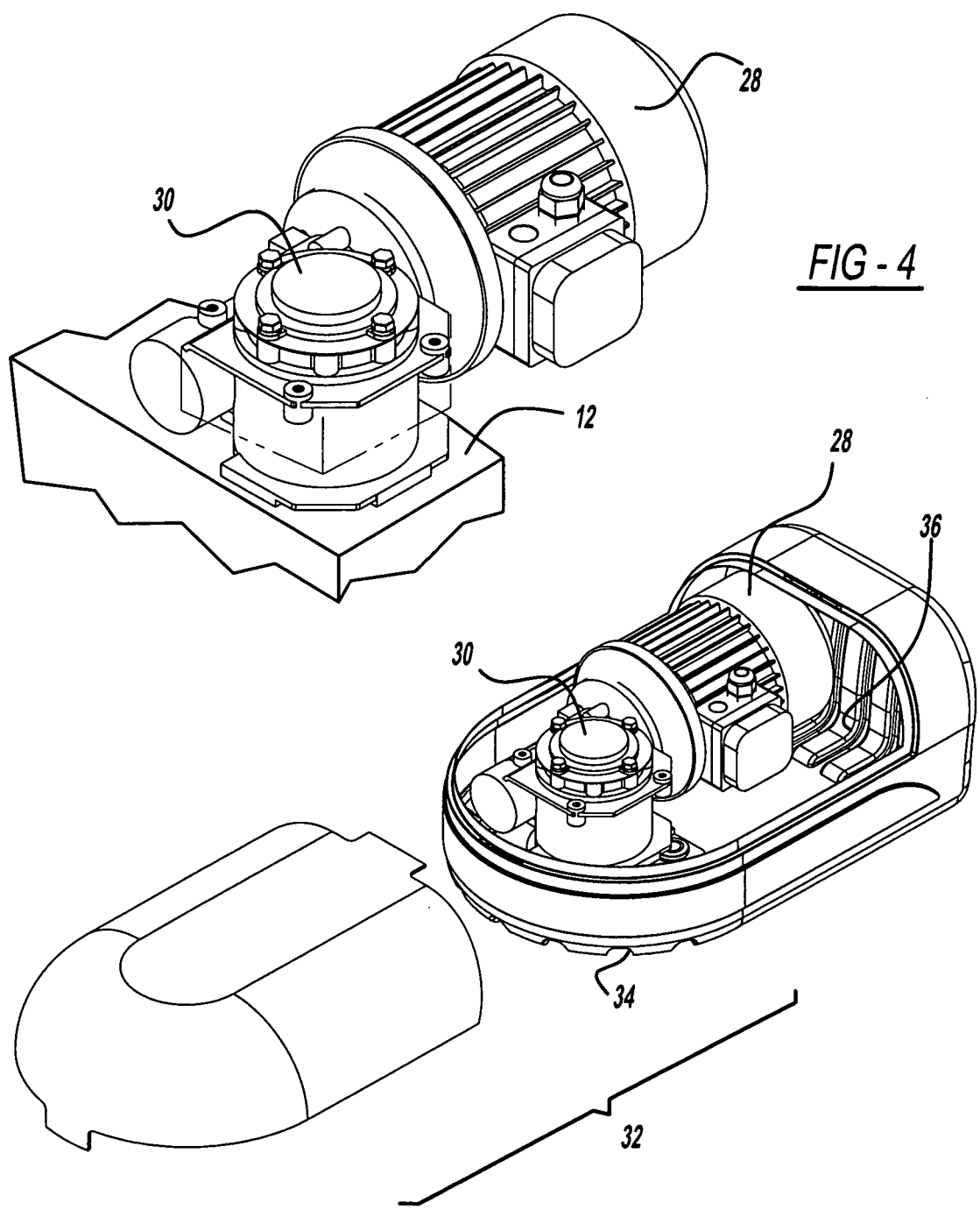
FIG. 4 is a detailed perspective view of a drive motor and gear train for driving a washing component, according to the present invention.
FIG. 5 is a detailed view of the motor in a housing for the motor as shown in FIG. 4.

In accordance with the present invention, the vehicle washing system component 12, whether it be a dryer 14, a wheel 16, top roller 48, mitters 17, washers or a mixer 18 for chemicals, or even a pump of a liquid or water delivery system 20, has a variable frequency drive electric motor or proportional control device 28 that connects to a gear train 30 for driving the component's speed or movement, this is best seen in FIG. 4. While a variable frequency motor is described, it is possible for the control mechanisms described herein to be used with other wash systems that do not use gears or variable frequency motors. The gear train 30 has a set gear ratio that is driven by the variable frequency motor 28 at two or more speeds. The motor 28 and gear train 30 are designed to be substantially waterproof. A housing 32 is provided which includes cooling slots 34 and 36 to protect yet allow circulation of air to the motor 28. A maximum and minimum speed for each component is entered into the software for the control unit 24. In the present embodiment of the invention, the variable frequency drive motor 28 of each component operates between these two speeds. When the variance of the system 10 is set to a certain percentage (as mentioned above, variance is set between zero and one-hundred) the control unit 24 coordinates with the components 12 of the system 10 to set the appropriate speed of the variable frequency drive motor 28 for a given component 12. Additionally, the control unit 24 uses the variance to determine other factors besides speed for systems or components that do not use variable frequency motors, such as hydraulic systems, fluid valves, etc.

The software sets the speed of each of the components 12 based on the equation for determining the rate of speed for a given component 12, which is:

$$C = \text{Min} + \frac{(\text{Max} - \text{Min})(\text{Variance})}{100}$$

In this equation, C is the set component rate of speed measured in rotations per minute (RPM), volts, pressure, flow, or any other suitable variable used for controlling the component 12. "Min" is the set minimum speed that is set by the operator for that component 12. "Max" is the set maximum speed that is set by the operator for that component 12. "Variance" is the percentage of the range between Min and Max and is related to the demand 25 communicated to the control unit 24. By using the above equation for calculating the component speed, C, each component 12 can operate independent from and at different speeds than the other components 12 in the system 10. For example, if the variance is at 40%, it might be more desirable to have the wheel components 16 rotate at 40 RPM, which would be a different rate of speed than the top roller 48 which might rotate at 20 RPM when the variance is 40%. This is merely an illustrative example, and it is within the scope of this invention to have virtually any type of configuration possible.

Additionally, the component 12 can be a pivoting washer such as the wheel washer 46. The pivoting washer of this type utilizes a pneumatic valve that facilitates the movement of the nozzle relative to the vehicle. The valve can be a 0-10 volt DC linear proportion flow valve that communicates with the control unit 24 using an analog to digital converter card. Alternatively, the valve can be a 4-20 milliamp closed loop AC valve that is controlled by the control unit 24. However, any type of control can be used. The control unit 24 controls the amount of power or displacement the valve in response to the feedback from the rest of the system components 12, and allows for correlating the speed of the wheel washer unit 46 with the conveyor 22.

In order to prevent damage to the components 12 of the system 10 and the variable frequency drive motor 28, an ampere (AMP) sensor is employed in the power line as part of one or more of the variable force motors. The AMP sensor detects if the current to the motor 28 exceeds a certain threshold. If the threshold is exceeded, a signal is sent to the control unit 24, which adjusts the power delivered to the variable frequency drive motor 28. This allows for the system 10 to minimize overloading of the individual components 12 that may occur as a result of variables like vehicle size, vehicle topography, vehicle misalignment, and component wear. For example, a wheel 16 can become overloaded if the wheel 16 becomes hung up on a portion of a vehicle such as a spare tire, roof rack, oversized mirror, etc. The use of the AMP sensor can detect such occurrences by determining if the variable frequency drive motor 28 is demanding an excessive amount of current. The control unit 24 will adjust the amount of power delivered to the variable frequency drive motor 28 when an overload signal is sent from the AMP sensor to the control unit 24, or the control unit 24 could signal retraction of the unit such as a side wheel 16, or the like.

The variable frequency drive motor 28 allows the component 12 to be controlled as to output in the form of RPM of the motor 28 which drives the component 12. The use of the variable frequency drive motor 28 allows the control unit 24, after sensing and comparing the speed of the conveyor 22, to adjust the frequency of the motor 28 for providing a predetermined condition of washing at a conveyor speed. The control unit 24 adjusts the vehicle wash line component or components 12 to meet the desired washing conditions at a selected speed of the conveyor 22. This provides the necessary wash at the greatest efficiency or at a desired level of efficiency which is compatible with the vehicle speed. For instance, adjusting the speed of the component 12 based on correlation with the conveyor 22 can keep a relatively constant surface feet per minute cleaning speed of a wheel, whether the line is processing fifty cars per hour, two-hundred cars per hour, or somewhere in between. Similarly, the motor speed on the dryer 14 or blower can be increased if the vehicle is moving through the line rapidly or decreased when vehicles are moving slowly.

Additionally, under certain conditions, such as during slow operation times, it may be desirable, because of slow movement of the vehicles through the wash line or under other predetermined conditions, to reduce the number of certain wash components 12 used during the wash cycle. For instance, in many high output installations two rows of dryer units 14 may be utilized, and the control system (or control unit 24) may selectively shutdown one or more rows of dryer units 14 or one or more individual dryer units 14 in each row, depending on the setup and conditions. This reduces power consumption in the vehicle washing system 10.

Figure 2:
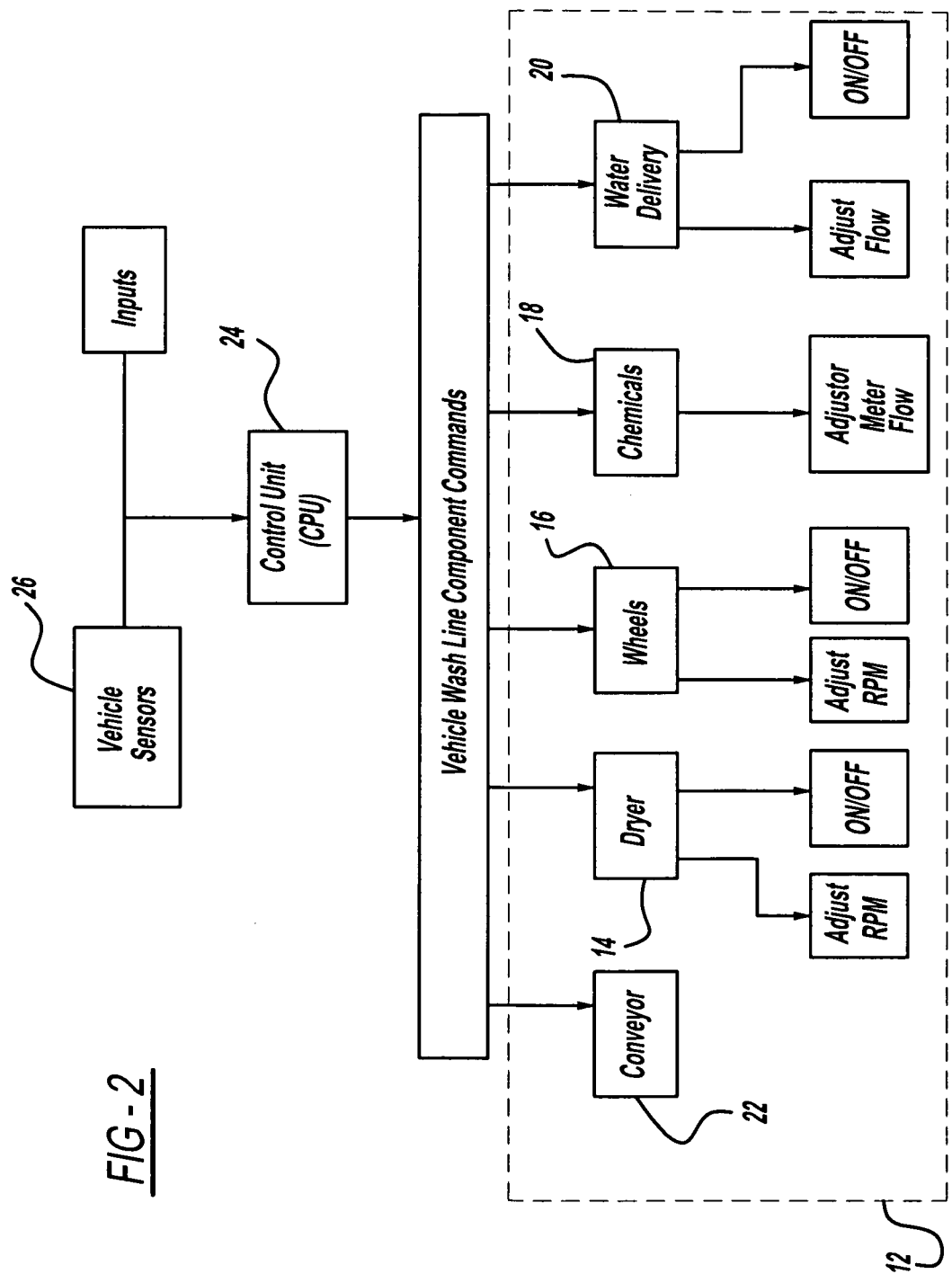
FIG. 2 is a schematic of control system for a vehicle wash system according to the present invention.
Figure 3:
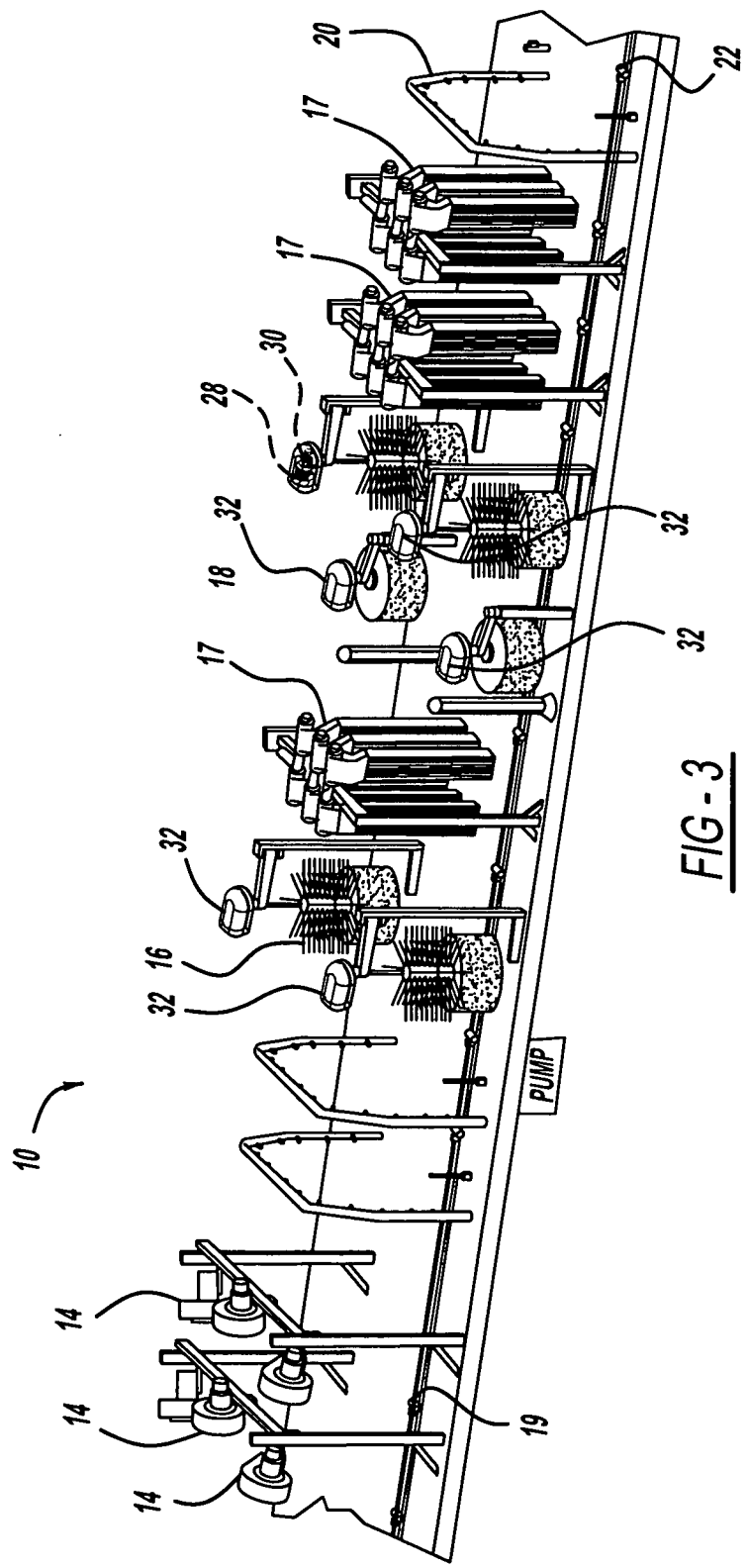
FIG. 3 is a detailed perspective view of a wash line including washing components, according to the present invention.

Additionally, the control unit 24 controls other systems such as a chemical mixing system or metering system 18 and water delivery systems, which include wash nozzles and drying nozzles, all to coordinate with the speed of the vehicle to provide an effective wash with greater efficiency. Thus, as shown at FIG. 2, the dryers 14 may be adjusted as to their speed or turned on and off by the controller, and wheels 16 in use in the wash line may be adjusted as to their speed or turned on and off. Chemicals may be adjusted with adjustable valves or may be adjusted by metering the flow of chemicals into the washing streams or the like. Similarly, water delivery may be adjusted for flow with the adjustable control valves or turned on or off if more than one bank of water delivery systems are included. The control unit 24 may control one or more of these depending on a particular condition and the desired level of efficiency.

In another aspect of the present invention, the control unit 24 may be connected to vehicle sensors, generally indicated at 26 in FIG. 2, which are outside of the car wash line. The sensors 26 may be infrared, sonic, photoeye, or any other sensor suitable for sensing the presence or absence of a vehicle or demand 25 of the system 10.

As shown in FIG. 1, vehicle sensors 26a-26e are provided along the external vehicle ingress route, generally shown at 50, and egress route, generally shown at 52. These sensors 26 are used to sense the number of vehicles waiting in line and coordinate with the control unit 24 to adjust the speed of the conveyor 22 accordingly. In a preferred embodiment, the control unit 24 is integrated such that the speed of the conveyor 22 is adjusted and the component wash system is adjusted to compensate for the selected speed of the conveyor 22.

In one embodiment of this control system, it is desirable to slow down the line, for instance, if no vehicles were sensed at sensor 26b, so that a line continues to exist at the car wash which may prompt other interested customers to enter the wash line. Similarly, if the sensors 26 sense the presence of a vehicle out at the sensor 26e, near the street, the control unit 24 may be used to increase the speed of the conveyor 22 in order to put more cars through the vehicle wash system to reduce the line. This system allows automatic control of the vehicle wash in order to adjust for conditions encountered during lineups of cars and cueing of cars into the system.

The control unit 24 may also adjust for the presence of vehicles at the egress route 52. Sensor 26a can sense the presence of a vehicle that is trying to leave the wash facility. If traffic on the street is heavy, the vehicle may be stopped in front of the wash facility which can cause a potential collision with vehicles coming off of the wash line. If the sensor 26a detects a vehicle, the control unit 24 may adjust the speed of the conveyor 22 to move slower or even stop the system 10 until the vehicle detected by sensor 26a moves out of the egress route 52. In such an application, adjusting the system 10 to move at a slower speed provides the advantage of not having to use emergency stops. The use of emergency stops increases the load on the system 10 because it would then be necessary to restart the system 10 once it was no longer necessary to have the system 10 stopped.

The sensors 26a-26e and/or control unit 24 may also be configured to sense the time of day and adjust the system based on the time more vehicles are typically present. Additionally, the sensors 26a-26e can be configured to sense the amount of ambient light and adjust the system 10 based on those conditions. For example, the system 10 might run slower on cloudy rainy days because persons are less likely to get their vehicles washed on such days.

Alternatively, the control unit 24 may control the speed of the conveyor 22 without the use of the sensors 26. In an alternate embodiment, the control unit 24 may adjust the speed of the conveyor 22 based on the number of cars waiting in line which have been input into the system 10 from the operator and how many vehicles have been washed. If the number of vehicles in line input into the system 10 exceeds a predetermined limit, that the speed of the conveyor 22 is raised to increase the amount of vehicles being washed.

Also, the control unit 24 may command the speed of the conveyor 22 to change based on an amount of vehicles per hour passing through the vehicle washing system 10, instead of through the use of the sensors 26. If the control unit 24 determines the number of washes being performed by the system 10 exceeds a predetermined value, the speed of the conveyor 22 is increased to compensate.

Additionally, the control unit 24 is programmable to anticipate the demand 25 as well. For instance, if there is a certain time of day, or certain days of the week in which it is known that a larger number of vehicles will pass through the system 10, the control unit 24 may be programmed to automatically change the speed of the conveyor 22 in anticipation of the increase in demand 25.

Although the frequency of the motor 28 is controlled by the control unit 24 based on the vehicle speed, it is contemplated that other operating characteristics could be measured and used instead of vehicle speed. For example, in certain applications it might be more advantageous to measure the amount of water flow outputted by the water delivery mechanisms 20, or wattage of the dryers 14, the speed of the wheels 16, or the output of the chemical mixers 18. These measured operating characteristics could be used instead of or in addition to the vehicle speed data.

Figure 6:
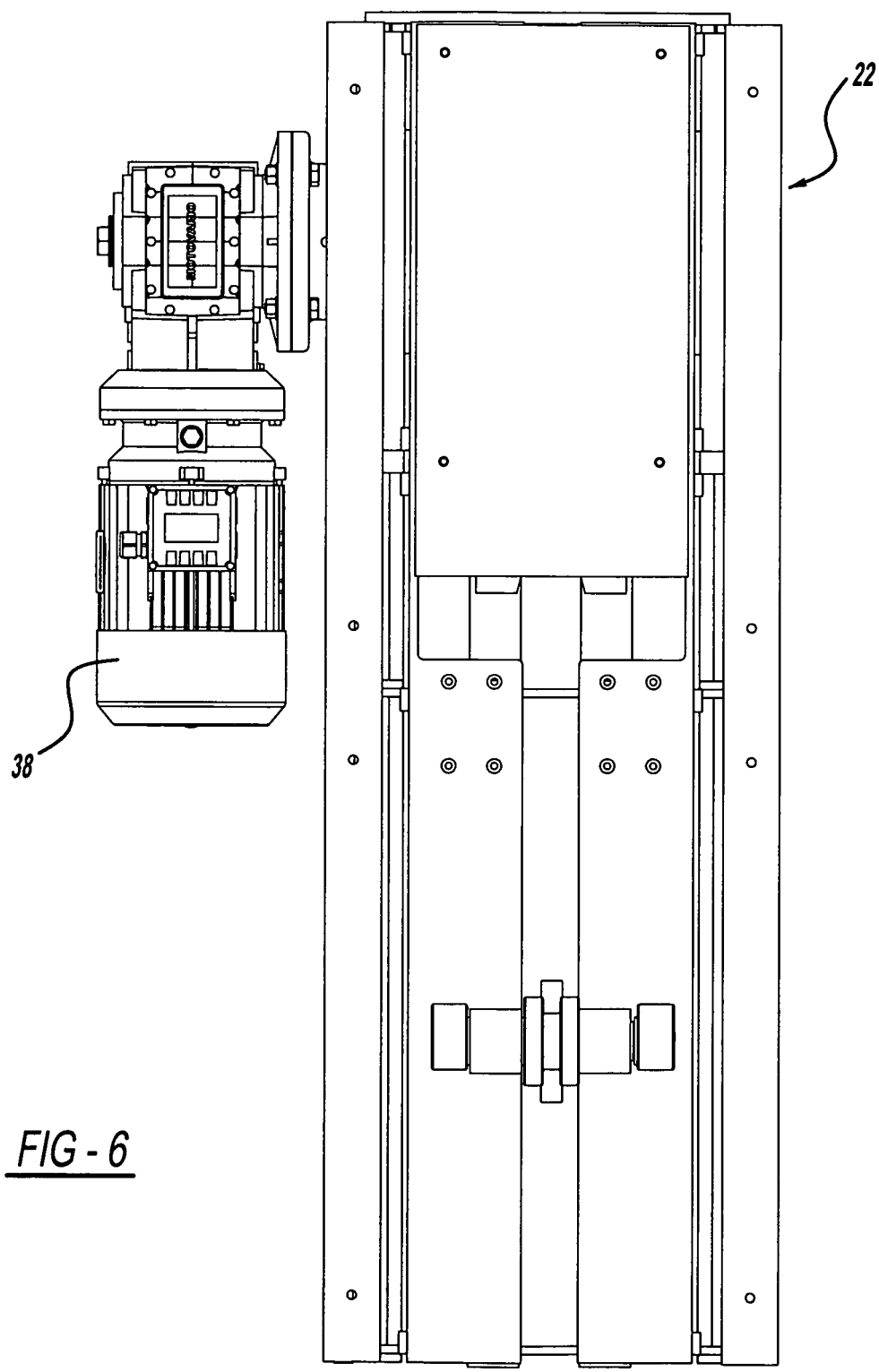
FIG. 6 is top view of a conveyor motor assembly, according to the present invention.
Figure 7:
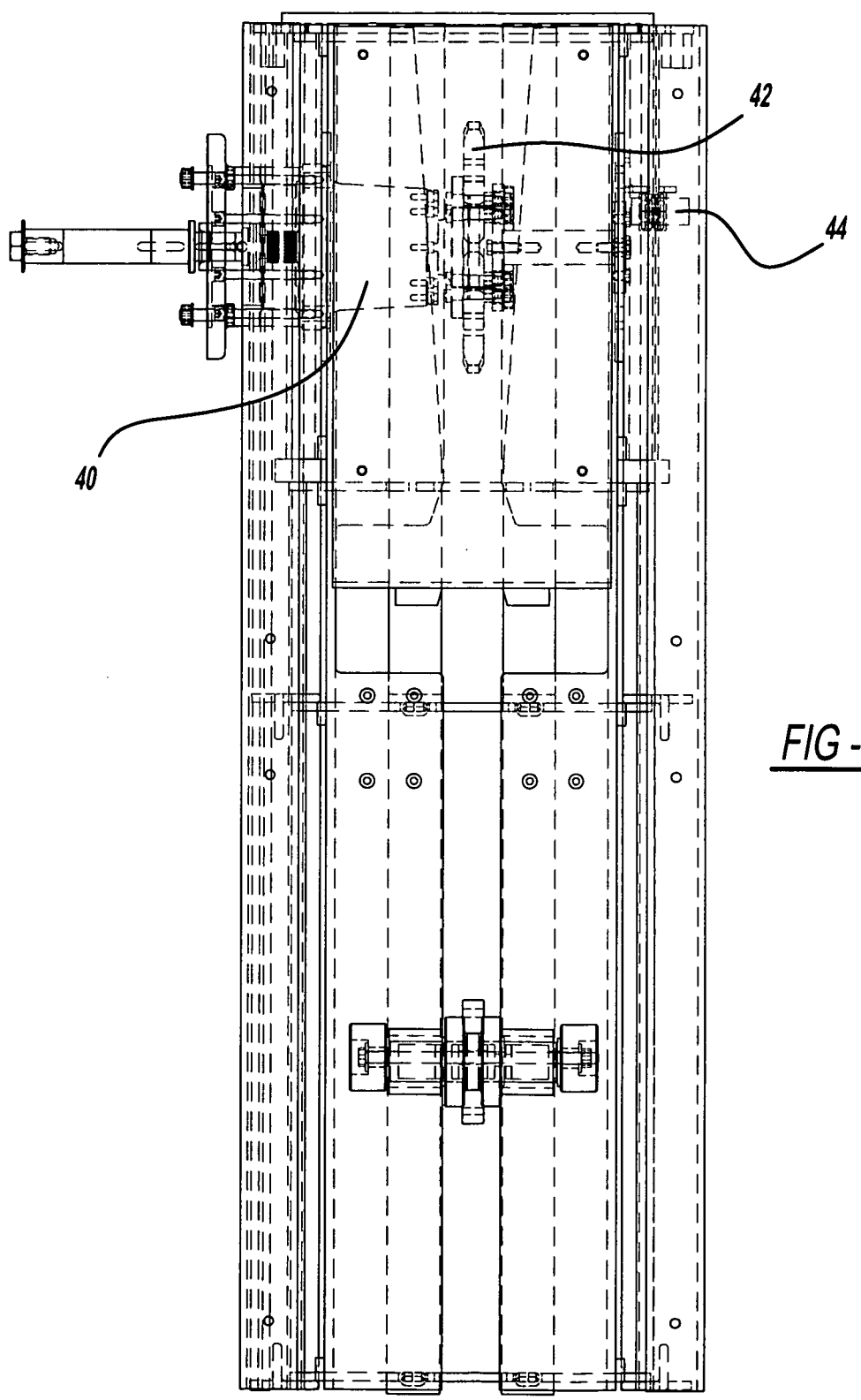
FIG. 7 is a top sectional view of the conveyor with the motor removed, according to the present invention.

In another aspect of the present invention, each component 12 in the system 10 has an established (or "default") position which is stored in the memory of the control unit 24. With particular reference to FIGS. 6-7, the conveyor apparatus 22 has a drive train motor 38 which works in conjunction with a gear train 40 to drive conveyor sprocket 42. An encoder 44, which is connected to the sprocket 42, provides the position of the vehicle, at all times, in the wash tunnel to the control unit 24 when the vehicle in the apparatus 22 leaves the work area of each associated component 12. When the vehicle leaves the associated work area of a component 12, such as a mitter 17, for instance, the control unit 24 will power down to a lower power setting, or in the alternative turn-off, the variable frequency motor 28 for a brief period of time until the next vehicle enters the work area of the mitter component 17. The powering down of the component 12 saves resources, such as power, when the associated component 12 is between vehicles and therefore not in use.

Powering down the component 12 is also more desirable than turning the component 12 on and off between vehicles because the components 12 and other part of the system 10 are susceptible to damage by constantly turning the components 12 on and off. For example, power circuits and the variable frequency motors 28 are more susceptible to damage by constantly turning the components 12 on and off. Additionally, water lines and valves also are more susceptible to damage or break down as a result of being constantly turned on and off. Thus, it is more efficient for the system 10 to provide a way of powering down or significantly reducing resources without a total shut-off of power.

Additionally, with reference to the mitter 17 portion of the wash system 10, this component 12 has the disadvantage of making rather loud slapping noises when initially engaging and during disengagement of the vehicle. Utilizing the present invention, the control unit 24 may be used to allow the vehicle to enter into engagement with the mitter 17 prior to turning on the mitter 17. This avoids or reduces the objectionable slapping noise. Similarly, the encoder 44 in combination with the control unit 24 sense that the vehicle is about to enter or exit the service area of the mitter 17 and disengage the mitters 17 at appropriate times to accomplish minimizing the unwanted slapping of the mitters 17 against the vehicle. The variable frequency drive motor 28 of the mitter 17 may be turned off or adjusted to reduce or prevent objectionable slapping.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A vehicle washing system comprising:
   one or more controlled components of said vehicle washing system;
   a variable speed conveyor configured to move a vehicle relative to said one or more controlled components to move at a rate of speed of movement during a wash cycle;
   a plurality of sensors configured to sense a condition including at least one vehicle throughput and vehicles waiting in line and adjusting the rate of speed of said variable speed conveyor and a speed of said one or more controlled components; and
   a control unit configured to adjust and correlate the one or more controlled components and said rate of speed relative to a predetermined vehicle throughput of said vehicle washing system such that the at least one vehicle throughput of said vehicle washing system may be varied while maintaining the integrity of the vehicle washing system by slowing or speeding up the one or more controlled components to match a vehicle speed as necessary depending on the at least one vehicle throughput.

2. The vehicle washing system of claim 1, wherein said one or more controlled components include one or more of a group consisting of mitters, wheels, conveyor, blowers, tire sprayers, mixers, liquid delivery systems and top rollers.

3. The vehicle washing system of claim 1, wherein said predetermined vehicle throughput is based on a demand that affects the at least one vehicle throughput of the vehicle washing system.

4. The vehicle washing system of claim 1, wherein said one or more controlled components include a variable frequency drive motor connected to and powering said one or more controlled components, said control unit is operably connected to and adjusts a frequency of said variable frequency drive motor which adjusts the power translated to said one or more controlled components.

5. The vehicle washing system of claim 4, wherein said variable frequency drive motor powers a drying blower.

6. The vehicle washing system of claim 1, wherein said one or more controlled components is a plurality of drying blowers and said control unit adjusts the power of said plurality of drying blowers.

7. The vehicle washing system of claim 1, wherein said control unit determines said rate of speed by adjusting of said one or more controlled components using the following equation:

$$C = \text{Min} + \frac{(\text{Max} - \text{Min})(\text{Variance})}{100}$$

wherein "C" is a set component rate of speed,
"Min" is a set minimum speed that is set by an operator,
"Max" is the set maximum speed that is set by the operator, and
"Variance" is a percentage of a range between Min and Max.

8. The vehicle washing system of claim 1, wherein said one or more controlled components is a plurality of wheel members controlled by said control unit.

9. The vehicle washing system of claim 1, further comprising said one or more controlled components being one or more wheels, and a variable frequency drive motor operably connected to said one or more wheels for rotating said one or more wheels, wherein said control unit varies the frequency of said variable frequency drive motor for controlling the revolutions per minute of said one or more wheels.

10. The vehicle washing system of claim 1, wherein said one or more controlled components comprise a plurality of wheel members which include at least one variable frequency drive motor for varying the rotation speed of said plurality of wheel members, said control unit being operable for controlling the power to at least one of said plurality of wheel members for shutting off at least one of said plurality of wheel members, and said control unit being operable for controlling the frequency of said variable frequency drive motor for varying a speed of at least one of said plurality of wheel members, or a combination thereof, depending on the at least one vehicle throughput or the rate of speed of said variable speed conveyor.

11. The vehicle washing system of claim 1, wherein said one or more controlled components further comprise at least one liquid delivery system for operably contacting said vehicle with a liquid during movement of said vehicle.

12. The vehicle washing system of claim 11, further comprising a pneumatic valve that pivots said at least one liquid delivery system relative to said vehicle during movement, wherein said control unit controls the operation of said pneumatic valve.

13. The vehicle washing system of claim 12, wherein said at least one liquid delivery system includes at least one nozzle, wherein the flow through said at least one nozzle is controlled based on said predetermined vehicle throughput.

14. The vehicle washing system of claim 13, wherein said at least one liquid delivery system includes at least one pump having a variable frequency drive motor, and said control unit varies an output of said variable frequency drive motor and an output of said at least one pump based on said predetermined vehicle throughput.

15. The vehicle washing system of claim 14, wherein said vehicle washing system comprises a plurality of said at least one pumps wherein said control unit controls power to at least one of said plurality of pumps for shutting said power down based on a pre-selected condition correlated to said predetermined vehicle throughput.

16. The vehicle washing system of claim 1, wherein said control unit is a computer coupled to said plurality of sensors which senses vehicle movement along said one or more controlled components of said vehicle washing system, and controls said one or more controlled components of said vehicle washing system based on the at least one vehicle throughput or a sensed speed of said variable speed conveyor relative to said vehicle.

17. The vehicle washing system of claim 16, wherein said computer automatically controls and adjusts said speed of said one or more controlled components based on said sensed speed of said variable speed onveyor.

18. A vehicle washing system comprising:
a vehicle washing system component;
a variable speed conveyor configured to move a vehicle relative to said vehicle washing system component to move at a selectable and variable speed of movement during a wash cycle;
a plurality of sensors configured to sense a condition including at least one vehicle throughput and vehicles waiting in line, and said sensors operable for adjusting the speed of said variable speed conveyor and said vehicle washing system component; and
a control unit, said control unit configured for processing a relative speed of movement of said vehicle with respect to said vehicle washing system component and configured to adjust and correlate the vehicle washing system component for coordinating the vehicle washing system component in accordance with a speed of said vehicle such that the speed of the at least one vehicle throughput in the vehicle washing system may be varied while maintaining the integrity of the vehicle washing system by slowing or speeding up the vehicle washing system component to match the speed of the vehicle as necessary depending on the at least one vehicle throughput.

19. The system of claim 18, wherein said vehicle washing system component includes a variable frequency drive motor, and said control unit is operable for varying the frequency of said variable frequency drive motor for adjusting the operation of said vehicle washing system component.

20. The system of claim 19, wherein said variable frequency drive motor powers a drying blower, and said control unit controls the frequency of said variable frequency drive motor.

21. The system of claim 18, wherein said vehicle washing system component is a blower, and said control unit controls an output of said blower.

22. The system of claim 21, wherein said control unit powers, or lowers or raises the power, supplied to said blower based on said speed of movement of said vehicle.

23. The system of claim 18, wherein said vehicle washing system component is a wheel member configured to rotate, and said control unit controls the rate at which said wheel member rotates based on said speed of movement of said vehicle.

24. The system of claim 19, wherein said vehicle washing system component comprises a wheel member, and said variable frequency drive motor rotates said wheel member.

25. The system of claim 24, wherein said control unit varies the frequency of said variable frequency drive motor for controlling the revolutions per minute of said wheel member in response to said speed of said vehicle.

26. The system of claim 18, wherein said vehicle washing system component further comprises a plurality of wheel members which include at least one variable frequency drive motor for varying the rotational speed of said plurality of wheel members, said control unit being operable for controlling the power to at least one of said plurality of wheel members for shutting off at least one of said plurality of wheel members, controlling the frequency of said at least one variable frequency drive motor for varying the speed of at least one of said plurality of wheel members, or a combination of both, depending on the speed of said vehicle.

27. The system of claim 18, wherein said control unit adjusts said vehicle washing system component using the equation:

$$C = \text{Min} + \frac{(\text{Max} - \text{Min})(\text{Variance})}{100}$$

wherein "C" is a set component rate of speed,
"Min" is a set minimum speed that is set by an operator,
"Max" is the set maximum speed that is set by the operator, and
"Variance" is a percentage of a range between Min and Max.

28. The system of claim 18, wherein said vehicle washing system component further comprises at least one liquid delivery system for contacting said vehicle with a liquid during movement of said vehicle.

29. The system of claim 28, wherein said at least one liquid delivery system includes at least one nozzle, wherein the flow through said at least one nozzle is controlled by said control unit based on said speed of said vehicle.

30. The system of claim 29, wherein said at least one liquid delivery system includes at least one pump having a variable frequency drive motor, and said control unit varies an output of said motor and an output of said at least one pump based on the speed of said vehicle.

31. The system of claim 30, wherein said vehicle washing system comprises a plurality of said pumps, wherein said control unit controls the power to at least one of said plurality of pumps for shutting the power down based on pre-selected conditions correlated to the speed of said vehicle.

32. The system of claim 18, wherein said control unit is a computer coupled to said plurality of sensors which senses vehicle movement along said vehicle washing system component and controls said vehicle washing system component based on a sensed speed of said vehicle.

33. The system of claim 32, wherein said computer automatically controls said vehicle washing component.

34. The system of claim 28, wherein said vehicle washing system component comprises at least one of the following:
wheels, blowers, mitters, sprayers or mixers; and
an encoder operably connected to said vehicle washing system component, wherein said encoder determines when said vehicle enters and exits said vehicle washing system component and functions to send a signal to said control unit which in turn controls the operation of said vehicle washing system component in response to the signal from said encoder.

35. A vehicle washing system comprising:
a vehicle washing system component;
a variable speed conveyor configured to move a vehicle relative to said vehicle washing system component to move at a selectable and variable speed of movement during a wash cycle;
a plurality of sensors configured to sense a condition including at least one vehicle throughput and vehicles waiting in line for adjustment of the speed of said variable speed conveyor and a speed of said vehicle washing system component; and
a computerized control unit, said computerized control unit configured for processing a relative speed of movement of said vehicle with respect to said vehicle washing system component and configured to adjust and correlate said vehicle washing system component for coordinating the vehicle washing system component in accordance with the speed of said vehicle such that a speed of the at least one vehicle throughput in the vehicle washing system may be varied while maintaining the integrity of the vehicle washing system by slowing or speeding up the vehicle washing system component to match the speed of the vehicle as necessary depending on the at least one vehicle throughput.

36. The system of claim 35, wherein said vehicle washing system component includes a variable frequency drive motor and said computerized control unit is operable for varying the frequency of said variable frequency drive motor for adjusting said vehicle washing system component 37. The system of claim 36, wherein said computerized control unit varies the frequency of said frequency drive motor using the following equation:

$$C = \text{Min} + \frac{(\text{Max} - \text{Min})(\text{Variance})}{100}$$

wherein "C" is a set component rate of speed,
"Min" is a set minimum speed that is set by an operator,
"Max" is the set maximum speed that is set by the operator, and
"Variance" is a percentage of a range between Min and Max.

38. The system of claim 36, wherein said variable frequency drive motor powers a drying blower.

39. The system of claim 38, wherein said computerized control unit controls the frequency of said variable frequency drive motor for varying an output of said drying blower 40. The system of claim 39, wherein said computerized control unit controls the power to said drying blower for turning off said variable frequency drive motor.

41. The system of claim 39, wherein a plurality of said drying blowers are provided, and said computerized control unit selectively: powers down said variable frequency drive motor, controls the frequency of said variable frequency drive motor, or combinations of both, depending on the speed of said vehicle 42. The system of claim 36, wherein said vehicle washing system component comprises a wheel member, and said variable frequency drive motor rotates said wheel member.

43. The system of claim 42, wherein the computerized control unit varies the frequency of said variable frequency drive motor for controlling the revolutions per minute of said wheel member in response to the speed of said vehicle.

44. The system of claim 36, wherein said vehicle washing system component further comprises a plurality of wheel members which include at least one variable frequency drive motor for varying the rotation speed of said plurality of wheel members, said computerized control unit being operable for controlling the power to at least one of said plurality of wheel members for shutting off at least one of said plurality of wheel members, controlling the frequency of said variable frequency drive motor for varying the speed of at least one of said plurality of wheel members, or a combination of both, depending on the speed of said vehicle.

45. The system of claim 35, wherein said vehicle washing system component further comprises at least one liquid delivery system for contacting the vehicle with a liquid during movement of said vehicle.

46. The system of claim 45, wherein said at least one liquid delivery system includes at least one nozzle, wherein the flow through said at least one nozzle is controlled based on the speed of said vehicle by said computerized control unit.

47. The system of claim 46, wherein said at least one liquid delivery system includes at least one pump having a variable frequency drive motor and said computerized control unit varies an output of said variable frequency drive motor and an output of said at least one pump based on the speed of said vehicle.

48. The system of claim 47, wherein said vehicle washing system comprises a plurality of said pumps, wherein said computerized control unit controls the power to at least one of said plurality of pumps for shutting the power down based on pre-selected conditions correlated to the speed of said vehicle.

49. The system of claim 35, wherein said computerized control unit senses vehicle movement along said vehicle washing system component and controls said vehicle washing system component based on a sensed speed of said vehicle.

50. The system of claim 49, wherein a speed of said variable speed conveyor is set by input to said computerized control unit by an operator, and said computerized control unit automatically controls said vehicle washing system component.

51. The system of claim 35, wherein said vehicle washing system component comprises at least one of the following:
wheels, blowers, mitters, spoilers or mixers; and
an encoder operably connected to said vehicle washing system component, wherein said encoder determines when said vehicle enters and exits said vehicle washing system component and functions to send a signal to said computerized control unit, which in turn controls the operation of said vehicle washing system component in response to said signal from said encoder.

52. A vehicle washing system comprising:
at least one controlled component of said vehicle washing system;
a variable speed conveyor configured to move a vehicle or moving the at least one controlled component to move at a rate of speed of movement relative to said vehicle during a wash cycle;
a plurality of sensors configured to sense a condition including at least one vehicle throughput and vehicles waiting in line and adjusting the variable speed conveyor rate of speed and said at least one controlled component of said vehicle washing system; and
a control unit operable for correlating with said plurality of sensors and adjusting at least one operating variable of said at least one controlled component based on said speed of said apparatus, said control unit configured to adjust and correlate the at least one controlled component and said rate of speed relative to a predetermined vehicle throughput of said vehicle washing system such that the at least one vehicle throughput of said vehicle washing system may be varied while maintaining the integrity of the vehicle washing system by slowing or speeding up the at least one controlled component to match a vehicle speed as necessary depending on the at least one vehicle throughput.

53. The system of claim 52, wherein said control unit adjusts the at least one operating variable based on the following equation:

$$C = Min + \frac{(Max - Min)(Variance)}{100}$$

wherein "C" is a set component rate of speed,
"Min" is a set minimum speed that is set by an operator,
"Max" is the set maximum speed that is set by the operator, and
"Variance" is a percentage of a range between Min and Max.

54. The vehicle washing system of claim 52, wherein the at least one controlled component includes a variable frequency drive motor connected to and powering said at least one controlled component, said control unit is operably connected to and adjusts the frequency of said variable frequency drive motor which adjusts the power translated to said at least one controlled component.

55. The vehicle washing system of claim 54, wherein said variable frequency drive motor powers a drying blower.

56. The vehicle washing system of claim 55, wherein a plurality of said drying blowers are provided and said control unit powers down or controls the frequency of one or more of said plurality of drying blowers, depending on said rate of speed.

57. The vehicle washing system of claim 54, wherein said at least one controlled component of said vehicle washing system comprises a wheel member, and said variable frequency drive motor rotates said wheel member.

58. The vehicle washing system of claim 57, wherein said control unit varies the frequency of the variable frequency drive motor for controlling the revolutions per minute of said wheel member in response to said rate of speed of said vehicle or said variable speed conveyor.

59. The vehicle washing system of claim 54, wherein said at least one controlled component of said vehicle washing system further comprises a plurality of wheel members which include at least one variable frequency drive motor for varying the rotation speed of said plurality of wheel members, said control unit being operable for controlling the power to at least one of said plurality of wheel members and for shutting off at least one of said plurality of wheel members, controlling the frequency of said variable frequency drive motor for varying the speed of at least one of said plurality of wheel members, or a combination of both, depending on the speed of said vehicle or speed of said variable speed conveyor.

60. The vehicle washing system of claim 52, wherein the at least one controlled component of said vehicle washing system further comprises at least one liquid delivery system for contacting said vehicle with a liquid during movement of said vehicle or said movement of said variable speed conveyor relative to said vehicle.

61. The vehicle washing system of claims 60, further comprising a pneumatic valve that pivots said at least one liquid delivery system relative to said vehicle during movement, wherein said control unit controls the operation of said pneumatic value.

62. The vehicle washing system of claim 60, wherein said at least one liquid delivery system includes at least one nozzle, wherein the flow through said at least one nozzle is controlled based on the speed of said vehicle or the speed of said variable speed conveyor relative to said vehicle, both the speed of said vehicle and the speed of said variable speed conveyor controlled by said control unit.

63. The vehicle washing system of claim 62, wherein said at least one liquid delivery system includes at least one pump having a variable frequency drive motor, and said control unit varies an output of said variable frequency drive motor and an output of said at least one pump based on the speed of said vehicle or the speed of said variable speed conveyor relative to said vehicle.

64. The vehicle washing system of claim 63, wherein said vehicle washing system comprises a plurality of said pumps, wherein said control unit controls the power to at least one of said plurality of pumps for shutting said power down based on a pre-selected condition correlated to the speed of said vehicle or the speed of said variable speed conveyor relative to said vehicle.

65. The vehicle washing system of claim 62, wherein said control unit is a computer connected to said plurality of sensors which senses vehicle movement along at least one controlled component of said vehicle washing system and controls said at least one controlled component of said vehicle washing system based on the sensed speed of said vehicle or the sensed speed of said variable speed conveyor relative to said vehicle.

66. The vehicle washing system of claim 65, wherein the speed of said variable speed conveyor is set by input to said computer by an operator, and said computer automatically controls said at least one controlled component.

* * * * *